(12) United States Patent
Thorne

(10) Patent No.: US 7,076,911 B2
(45) Date of Patent: Jul. 18, 2006

(54) SOFT BODY COVERED SWIMMING-JIG FISHING LURE

(76) Inventor: David L. Thorne, 1759 S. 450 East, Kaysville, UT (US) 84037

( * ) Notice: Subject to any disclaimer, the term of this patent is extended or adjusted under 35 U.S.C. 154(b) by 0 days.

(21) Appl. No.: 11/003,807

(22) Filed: Dec. 3, 2004

(65) Prior Publication Data

US 2006/0117643 A1 Jun. 8, 2006

(51) Int. Cl.
*A01K 85/00* (2006.01)
(52) U.S. Cl. .................. 43/42.26; 43/42.28; 43/42.37; 43/42.39
(58) Field of Classification Search ............... 43/42.24, 43/42.26, 42.27, 42.28, 42.29, 42.3, 42.39, 43/42.37, 42.38, 42.47
See application file for complete search history.

(56) References Cited

U.S. PATENT DOCUMENTS

| | | | | |
|---|---|---|---|---|
| 1,321,850 A | * | 11/1919 | Rhodes | 43/42.39 |
| 2,185,668 A | * | 1/1940 | Hurdle | 43/42.28 |
| 2,218,280 A | * | 10/1940 | Deering | 43/42.26 |
| 2,567,180 A | * | 9/1951 | Bunkowski | 43/42.28 |
| 2,599,128 A | * | 6/1952 | Roberts | 43/42.27 |
| 2,605,577 A | * | 8/1952 | Waugler | 43/42.39 |
| D174,492 S | * | 4/1955 | Daves | D22/145 |
| 2,750,703 A | * | 6/1956 | Puste | 43/42.28 |
| 2,817,922 A | * | 12/1957 | Takeshita | 43/42.28 |
| 2,847,791 A | * | 8/1958 | Simmons | 43/42.26 |
| 2,932,916 A | * | 4/1960 | Strickland | 43/42.28 |
| 2,986,838 A | * | 6/1961 | Smyser | 43/42.39 |
| 2,989,817 A | * | 6/1961 | Kepler | 43/42.39 |
| 3,230,656 A | * | 1/1966 | Kozjak | 43/42.1 |
| 3,417,503 A | * | 12/1968 | Meulnart | 43/42.39 |
| 3,465,466 A | * | 9/1969 | Showalter | 43/42.24 |
| 3,611,614 A | * | 10/1971 | Ward | 43/42.24 |
| 3,868,784 A | * | 3/1975 | Sabol | 43/42.39 |
| D234,763 S | * | 4/1975 | Weathered | D22/126 |
| 3,883,979 A | * | 5/1975 | Williams, Jr. | 43/42.28 |
| 3,959,060 A | * | 5/1976 | Jones | 43/42.39 |
| 3,965,606 A | * | 6/1976 | Bingler | 43/42.39 |
| 3,971,152 A | * | 7/1976 | Husson, Jr. | 43/42.28 |
| D243,954 S | * | 4/1977 | Raquel | D22/145 |
| 4,038,774 A | * | 8/1977 | Misiak | 43/42.09 |
| 4,196,884 A | * | 4/1980 | Zeman | 43/42.39 |
| D256,268 S | * | 8/1980 | Green et al. | D22/126 |
| D258,833 S | * | 4/1981 | Yano | D22/128 |
| 4,638,586 A | * | 1/1987 | Hall | 43/42.26 |
| 4,672,768 A | * | 6/1987 | Pippert | 43/42.24 |
| 4,771,567 A | * | 9/1988 | Cannon | 43/42.26 |
| 4,790,100 A | * | 12/1988 | Green, Sr. | 43/42.28 |
| 4,827,660 A | * | 5/1989 | Dudeck | 43/42.39 |
| 4,843,754 A | * | 7/1989 | Spelts | 43/42.39 |
| 4,845,883 A | * | 7/1989 | Langer | 43/42.39 |
| 4,887,377 A | * | 12/1989 | Morris | 43/42.24 |
| 4,922,646 A | * | 5/1990 | Basgal | 43/42.33 |
| 5,090,151 A | * | 2/1992 | Salminen | 43/42.05 |
| 5,094,026 A | * | 3/1992 | Correll et al. | 43/42.28 |

(Continued)

FOREIGN PATENT DOCUMENTS

AU 9926943 A * 11/1999

(Continued)

*Primary Examiner*—Darren W. Ark
(74) *Attorney, Agent, or Firm*—Gale H. Thorne

(57) ABSTRACT

A fishing lure constructed from a swimming jig and a cover for the swimming jig. The cover having a pair of tilted fins which produce a unique fish attracting and catching action as the fishing lure is displaced through water.

2 Claims, 2 Drawing Sheets

U.S. PATENT DOCUMENTS

| | | | | |
|---|---|---|---|---|
| 5,133,146 A | * | 7/1992 | Stecher | 43/42.47 |
| 5,134,801 A | * | 8/1992 | Davey | 43/42.28 |
| 5,170,580 A | * | 12/1992 | Rosenblatt | 43/42.06 |
| D332,989 S | * | 2/1993 | Brown | D22/128 |
| 5,193,299 A | * | 3/1993 | Correll et al. | 43/42.47 |
| 5,228,230 A | * | 7/1993 | Vaught | 43/42.26 |
| 5,276,993 A | | 1/1994 | Rosenblatt | 43/42.24 |
| 5,299,378 A | * | 4/1994 | Ballard | 43/42.06 |
| 5,335,443 A | * | 8/1994 | Grigsby, Jr. | 43/44.81 |
| 5,349,776 A | * | 9/1994 | Lucas | 43/42.39 |
| 5,367,817 A | * | 11/1994 | Clark | 43/42.39 |
| 5,428,917 A | * | 7/1995 | Cunningham | 43/42.21 |
| 5,535,540 A | * | 7/1996 | Crumrine | 43/42.39 |
| 5,640,798 A | * | 6/1997 | Garst | 43/42.24 |
| 5,689,910 A | * | 11/1997 | Kato | 43/42.24 |
| 5,806,234 A | * | 9/1998 | Nichols | 43/42.37 |
| 5,893,231 A | * | 4/1999 | Kato | 43/42.24 |
| 6,061,949 A | * | 5/2000 | Fairchild | 43/42.28 |
| D429,310 S | * | 8/2000 | DiLiberti | D22/132 |
| 6,170,191 B1 | * | 1/2001 | Laney | 43/43.13 |
| 6,192,616 B1 | * | 2/2001 | Kent | 43/42.24 |
| 6,363,651 B1 | * | 4/2002 | Garst | 43/42.24 |
| 6,393,757 B1 | * | 5/2002 | Bomann | 43/42.24 |
| 6,675,525 B1 | * | 1/2004 | Ford | 43/42.24 |
| 6,718,683 B1 | * | 4/2004 | Hawkins | 43/42.39 |
| 6,763,631 B1 | * | 7/2004 | Santini | 43/42.39 |
| 6,922,938 B1 | * | 8/2005 | Ciuffo | 43/42.28 |
| 2002/0078619 A1 | * | 6/2002 | Hurtle | 43/42.39 |
| 2003/0046858 A1 | * | 3/2003 | Meraw | 43/42.28 |
| 2003/0084602 A1 | * | 5/2003 | Reed | 43/42.39 |
| 2005/0252070 A1 | * | 11/2005 | Becker | 43/42.39 |
| 2006/0010764 A1 | * | 1/2006 | Frawley et al. | 43/42.47 |

FOREIGN PATENT DOCUMENTS

| | | | | |
|---|---|---|---|---|
| FR | 2625867 A1 | * | 7/1989 | |
| FR | 2652991 A1 | * | 4/1991 | 43/42.24 |
| FR | 2672773 A1 | * | 8/1992 | 43/42.24 |
| GB | 2376163 A | * | 12/2002 | |
| JP | 4-173042-1 | * | 6/1992 | |
| JP | 7-163273 A | * | 6/1995 | |
| JP | 10-117635 A | * | 5/1998 | |
| JP | 11-289922 A | * | 10/1999 | |
| JP | 2001-238571 A | * | 9/2001 | |
| JP | 2002-153166 A | * | 5/2002 | |
| JP | 2002-272321 A | * | 9/2002 | |
| JP | 2004-97160 A | * | 4/2004 | |
| JP | 2004-215635 A | * | 8/2004 | |
| WO | WO-99/57973 A1 | * | 11/1999 | |
| WO | WO-02/45501 A1 | * | 6/2002 | |

* cited by examiner

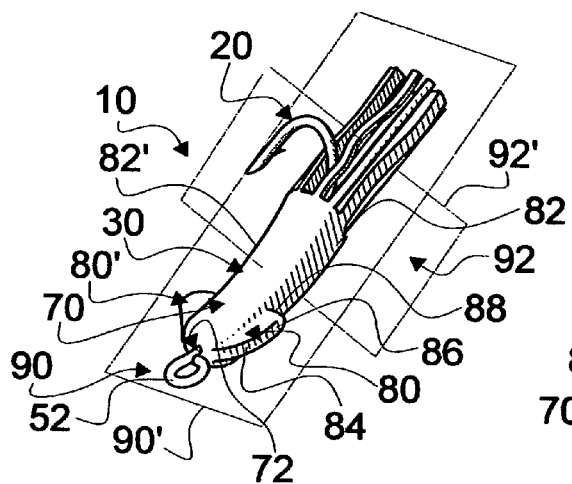
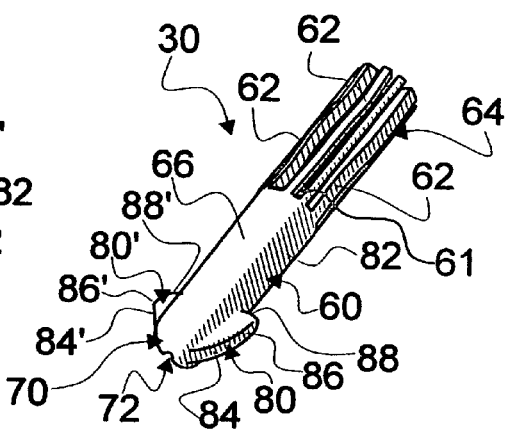
Figure 1
Figure 2
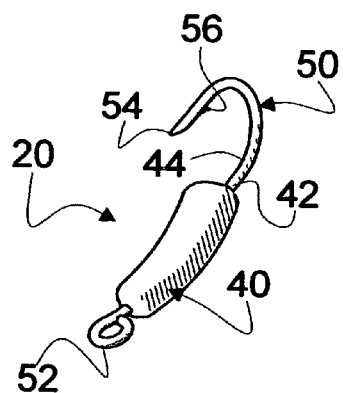
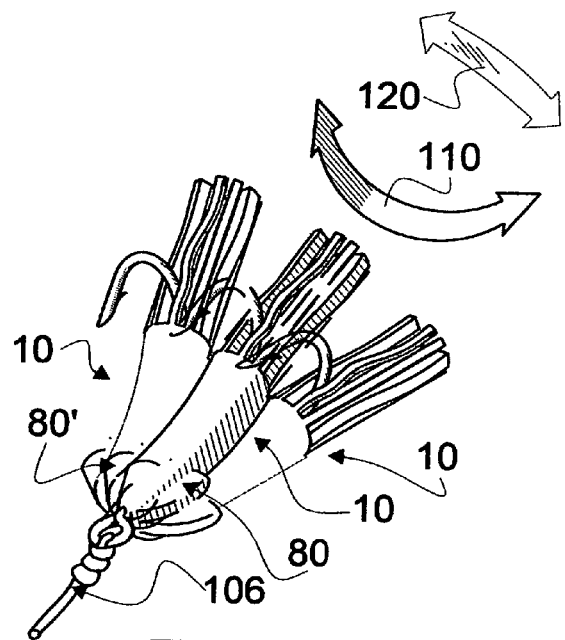
Prior Art
Figure 3
Figure 6

SOFT BODY COVERED SWIMMING-JIG FISHING LURE

FIELD OF INVENTION

This invention relates to soft-plastic body fishing lures and more specifically to fishing lures having a wherein a soft-plastic body covers a swimming-jig body.

BACKGROUND AND RELATED ART

Swimming-jig lures are well known in fishing art. Such swimming-jig lures are generally made by casting or otherwise enveloping a shank of a hook with a metal body. Swimming-jig lures are generally commercially available in diverse shapes and sizes and my be fished without any augmentation. However, soft-plastic bodies, which cover the metal body, are also commercially available and are also commonly used.

Such soft-plastic bodies are usually designed to fit snugly about the metal body of the swimming jig and often are fitted with a tail section which may be elongated or may be made of a series of elongated thin parts which attractively wag while the associated lure is displaced through water. The soft-plastic bodies are usually provided as replacement parts to be displaced about the metal body selectively by a fisherman.

The metal bodies are often arcuately shaped to augment lure "action" to improve lure attractiveness to targeted fish. Even though lure "action" is commonly considered the primary feature which determines lure effectiveness, other features, which are meant to attract fish, such as color, eyes, and spinner attachments are also found in various forms in commercial lures. Another attribute of the metal body of a swimming jig is a shape which generally orients disposition of an associated hook as the lure is retrieved through water.

BRIEF SUMMARY AND OBJECTS OF THE INVENTION

In brief summary, this novel invention provides a lure having a unique "action" which is attractive to fish. The "action" of this lure being defined as a complex motion of a lure which includes wagging and rocking as the lure is displaced through water. A lure made according to the invention employs a swimming jig having a metal body which encloses the shank of a fishing hook and an elongated hollow cover made of soft plastic which is sized and shaped to fit snugly about the metal body.

While a large variety of swimming-jigs may be used in accordance with the invention, it is important that an eyelet or similar appendage for connecting a fishing line be affixed at the forward or front end of the swimming-jig. Generally, it is also preferred that the body of the associated metal body be securely affixed to the shank of a hook and be of an arcuate shape that causes a barbed portion of the hook to be elevated above the body as the jig is displaced through water. In such a jig, a plane is defined to reside along direction of pull of the lure by a fishing line (along the shank of the hook) perpendicular to the vertical orientation of the barbed portion of the dorsally disposed hook which arches away from the shank. This is the plane of general stability of the swimming jig as it is displaced through water.

At the front or forward end, the cover is closed about an opening through which a portion of the shank and eyelet is displaced. A key aspect of the cover is a pair of fins, each fin of which is juxtaposed relative to the other fin to extend outward from opposing sides of the cover and be tilted relative to the plane. The forward end of each fin departs tangentially from the closing end of the cover and is tilted such that forces placed upon the lure being displaced through water tend to urge the front of the lure upward. Such urging destabilizes the lure as it is displace through water causing a non-uniform rocking and wagging action which is attractive to fish. As a further attractive feature, the cover may be formed with a tail of thin, elongated flexible members.

It is a principle object to provide a lure composed of a swimming jig and an elongated soft plastic cover which is sized and shaped to conformably cover the swimming jig, the cover comprising a pair of forwardly disposed, outwardly extending fins which destabilize the lure to provide a compound rocking and wagging motion as the lure is displaced through water.

BRIEF DESCRIPTION OF THE DRAWINGS

FIG. 1 is a perspective of a lure made according to the invention, said lure being constructed of a swimming-jig covered by a resilient soft plastic body.

FIG. 2 is a perspective of the resilient soft plastic body which is seen in FIG. 1.

FIG. 3 is a perspective of a swimming-jig fishing lure.

FIG. 6 is a perspective of the lure seen in FIG. 1, affixed to a fishing line, with two dashed line images of the lure being displaced from a centrally disposed solid line image to demonstrate lateral or wagging motion of the lure as it is displaced through water.

DETAILED DESCRIPTION OF THE ILLUSTRATED EMBODIMENTS

Figure 5:
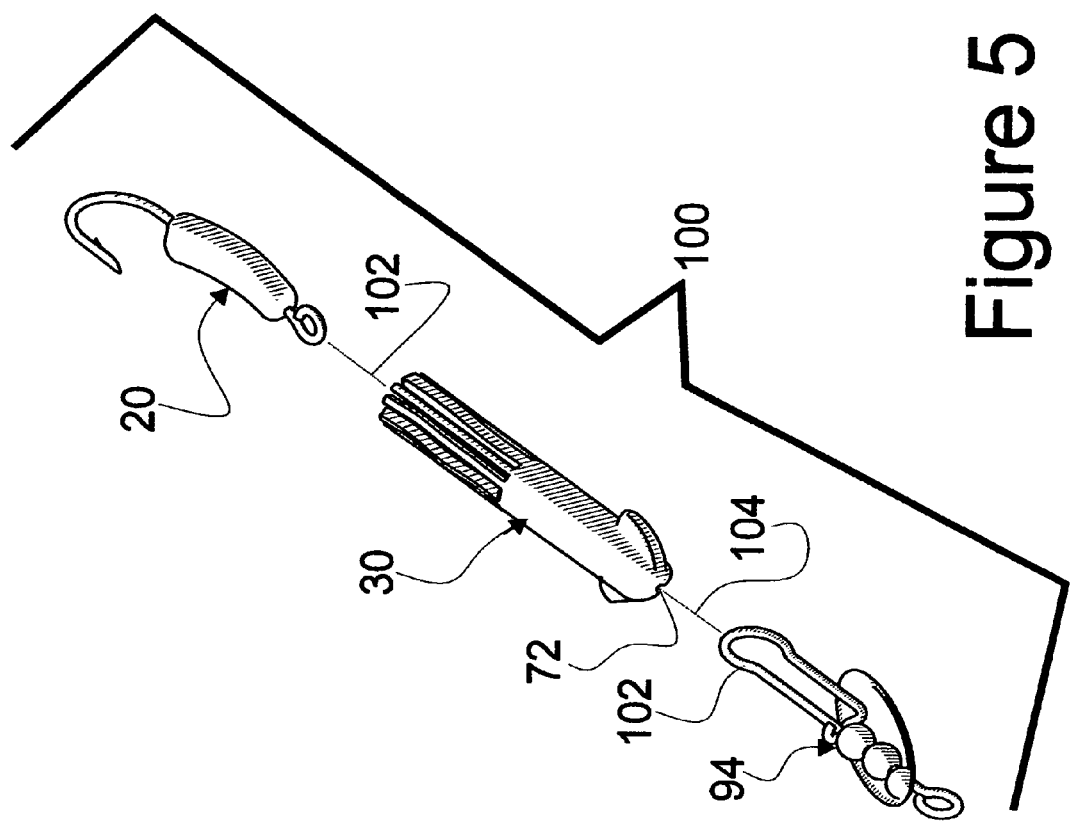
FIG. 5 is an exploded perspective of the fishing lure seen in FIG. 4.

In this description, the term proximal is used to indicate the segment of the device normally closest to a line attachment of a lure. Distal refers to the opposite end. Dorsal refers to a portion of the lure which relates to the dorsal portion of a swimming fish. Ventral is the opposite of dorsal. Reference is now made to the embodiments illustrated in FIGS. 1–6 wherein like numerals are used to designate like parts throughout.

Reference is now made to FIG. 1, wherein a lure 10 made according to the instant invention is seen. Generally, lure 10 comprises a swimming jig 20 mostly enclosed by a soft, resilient body cover 30.

While swimming jigs may be made in many shapes and forms, an exemplary swimming jig 20 is seen in FIG. 3. As seen in FIG. 3, swimming jig 20 comprises a metal body 40 which surrounds and encloses a major portion 42 of a shank 44 of a hook 50. Generally, hook 50 also comprises a proximal eyelet 52 whereat fishing line or other fishing apparatus is affixed for fishing and a sharpened end 54. To aid in catching fish a barb 56 may be associated with end 54. As seen in FIG. 3, metal body 40 may be arcuately shaped. Metal body 40 is generally made of lead or other heavy metal. When making or using metal body 40, care in handling, labeling and use should be taken if metal selected is lead or other potentially dangerous material.

An unattached body cover 30 is seen in FIG. 2. Body cover 30 comprises a hollow elongated body 60 with an open rear end 61 defining an edge therealong, a series of trailing strips (generally numbered 62) extending rearwardly from the edge at the rear end 61 which make up tail section 64 and a proximal section 70. Body 60 has an outside surface 66. Proximal section 70 is arcuated closed about a hole 72 wherethrough eyelet 52 is displaced when affixing cover 30 to swimming jig 20. Of critical importance is a first fin 80 affixed to a side 82 of cover 30 and a second fin 80' juxtaposed fin 80 on the other side 82'. Fin 80' is the mirror image of fin 80 and will be understood to have the same physical properties as fin 80 and, therefore, be numbered with primes of numbers used for fin 80, so only fin 80 will be described herein in detail.

Fin 80 has a leading or proximal edge 84, and outwardly disposed edge 86 and a distal edge 88. Note that, hole 72 (as seen in FIG. 1) preferably closes around shaft shank 42 to enclose body 40 (seen in FIG. 3). Referring to FIG. 1, a plane 90 (outlined by dashed lines 90') is defined to contain shank 42 and be perpendicular to another plane 92 (outlined by dashed lines 92') which contains a dorsally disposed portion of sharpened 54 and shank 42. Fin 80 is tilted relative to plane 90 such that proximal edge 84 lies above plane 90 and distal edge 88 lies below plane 90, thus providing a surface which is not in line with direction of pull of a fishing line attached to eyelet 52. Note that it may not be necessary to have fin 80 intersect plane 90, but relative dorsal to ventral disposition of edge 84 to edge 88 must be maintained. An angle subtended by fin 80 relative to plane 90 is preferably between 5 and 10 degrees. Further proximal edge 84 is tangentially disposed relative to curvature of arcuately closed end 70. Maximum departure of outwardly disposed edge 86 from outside surface 66 is preferred to be from 0.8 to 1.0 times the diameter of outside surface 66 of cover body 60. Fin 80' is similarly disposed and characterized on side 82' of cover 30.

Figure 4:
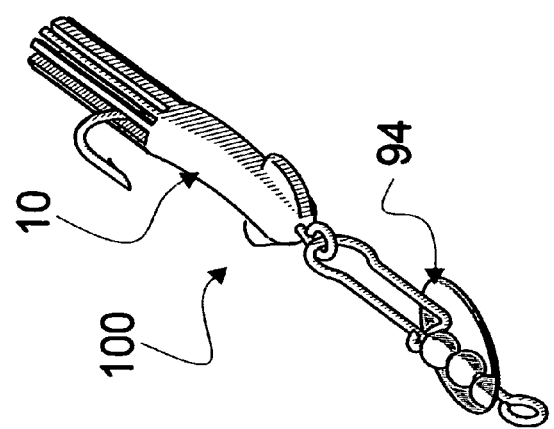
FIG. 4 is a perspective of a lure made according to the instant invention and affixed to a spinner.

Reference is now made to FIG. 4 wherein a spinner assembly 94 is seen to be optionally added to lure 10 to form a swimming jig-spinner combination 100. Combination 100 provides a lure of increased attraction to fish, providing action of spinner assembly 94 and unique trailing action of lure 10.

Assembly of lure 10 and combination 100 may be accomplished as seen in FIG. 5. To form lure 10, eyelet 52 and metal body 40 are inserted into hollow cylindrical cover body 60 (see dotted line 102) until eyelet 52 is available through hole 72. To form combination 100 a clip-ring 102 is affixed to eyelet 52 (see dotted line 104).

Lure 10 may be used alone or affixed to spinner assembly 94 to form combination 100. When used alone, lure 10 may be affixed to a fishing line 106 as seen in FIG. 6. As lure 10 is displaced through water, action due to fins 80 and 80' cause lure 10 to rock through an arcuate loop as indicated by arrow form 110 as well as to wag from side to side as indicated by arrow form 120. This combination of rocking and wagging yields an action which has proven effective in attracting and catching fish.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A single section soft body covered swimming jig fishing lure which when pulled through water exhibits a complex motion of wagging and rocking, said lure comprising:

a swimming jig comprising a hard metal body formed about a shank of a hook which, when towed through water, comprises a forward end which is affixed to a towing line and a following rearward end, which provides a dorsally disposed sharpened end segment at the rearward end and which has an eyelet affixed to the forward end, and said shank lying parallel to a first plane which is perpendicular to a direction of displacement of the dorsally disposed segment;

a soft plastic hollow cover mounted on said swimming jig and being made of resilient material and sized and shaped to conform to a predetermined shape of the hard metal body, said cover comprising an elongated tubular body which has an outside surface with a diameter transverse to the shank, said elongated tubular body is arcuately closed about an opening in a proximal end thereof wherethrough the eyelet is displaced, said tubular body having a open rear end defining an edge therealong, and a plurality of strips extending rearwardly from said edge;

said cover comprising a pair of juxtaposed fins, each fin being disposed on a side of the elongated body opposite the other fin, each fin being tangentially contiguous with the proximal end of the cover and extending laterally outward from said elongated body, each of said fins comprising a proximal edge at the proximal end of the cover and a distal edge and an outer edge which is contiguous between the proximal edge and the distal edge thereby defining a substantially planar shape such that each fin is aligned with a second plane, said second plane being tilted at an angle between 5 degrees and 10 degrees relative to the first plane such that said proximal edge lies above said first plane and said distal edge lies below said first plane, and as the lure is displaced through water, action of water against the pair of fins urges the proximal end of the cover, and thereby the forward end of the hard metal body, upward thereby displacing and destabilizing the lure and causing a rocking and wagging action.

2. The soft body covered swimming jig fishing lure according to claim 1, wherein said outer edge is displaced from said outside surface of said cover tubular body a distance of 0.8 to 1.0 times the diameter of said outside surface of said cover tubular body.

\* \* \* \* \*